(12) United States Patent
Kawai (10) Patent No.: US 8,049,807 B2
(45) Date of Patent: Nov. 1, 2011

(54) DIGITAL CAMERA AND DUST REDUCTION APPARATUS FOR DIGITAL CAMERA

(75) Inventor: Sumio Kawai, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 939 days.

(21) Appl. No.: 11/897,323

(22) Filed: Aug. 29, 2007

(65) Prior Publication Data
US 2008/0068488 A1    Mar. 20, 2008

Related U.S. Application Data

(60) Provisional application No. 60/842,227, filed on Sep. 5, 2006.

(51) Int. Cl.
H04N 5/225    (2006.01)
(52) U.S. Cl. .......................... 348/340; 348/335; 348/374
(58) Field of Classification Search .................. 348/335, 348/340, 374
See application file for complete search history.

(56) References Cited

U.S. PATENT DOCUMENTS

| | | | |
|---|---|---|---|
| 7,006,138 B2* | 2/2006 | Kawai | 348/340 |
| 7,271,520 B2* | 9/2007 | Min et al. | 310/316.03 |
| 7,324,149 B2* | 1/2008 | Takizawa et al. | 348/335 |
| 7,339,623 B2* | 3/2008 | Kawai | 348/340 |
| 2003/0165744 A1* | 9/2003 | Schubert et al. | 429/303 |
| 2003/0202114 A1* | 10/2003 | Takizawa et al. | 348/335 |
| 2003/0214588 A1* | 11/2003 | Takizawa et al. | 348/207.99 |
| 2003/0214599 A1* | 11/2003 | Ito et al. | 348/335 |
| 2003/0218685 A1* | 11/2003 | Kawai | 348/340 |
| 2004/0012714 A1 | 1/2004 | Kawai | |
| 2004/0047625 A1* | 3/2004 | Ito et al. | 396/429 |
| 2004/0090549 A1* | 5/2004 | Takizawa et al. | 348/340 |
| 2004/0169761 A1 | 9/2004 | Kawai | |
| 2004/0227837 A1 | 11/2004 | Ito | |
| 2004/0263669 A1 | 12/2004 | Kobayashi | |
| 2005/0088536 A1 | 4/2005 | Ikeda | |
| 2005/0088563 A1* | 4/2005 | Ito et al. | 348/335 |
| 2005/0258712 A1* | 11/2005 | Hata et al. | 310/323.17 |
| 2006/0001331 A1* | 1/2006 | Nagahama | 310/316.01 |
| 2006/0067663 A1* | 3/2006 | Kita | 396/72 |
| 2006/0115177 A1* | 6/2006 | Ishiga | 382/275 |
| 2006/0215797 A1* | 9/2006 | Takeuchi | 375/371 |
| 2006/0279638 A1* | 12/2006 | Matsuda et al. | 348/208.7 |
| 2007/0029896 A1* | 2/2007 | Ha et al. | 310/317 |
| 2007/0035656 A1* | 2/2007 | Inaba | 348/373 |
| 2007/0153385 A1* | 7/2007 | Sakai et al. | 359/511 |
| 2007/0217775 A1* | 9/2007 | Shirono et al. | 396/72 |

FOREIGN PATENT DOCUMENTS

| | | |
|---|---|---|
| JP | 2002-204379 | 7/2002 |
| JP | 2003-338965 | 11/2003 |

* cited by examiner

*Primary Examiner* — Lin Ye
*Assistant Examiner* — Chia-Wei A Chen
(74) *Attorney, Agent, or Firm* — John C. Pokotylo; Straub & Pokotylo (57) ABSTRACT

Arranged are an optical element, a piezoelectric element arranged on the optical element, and an oscillation circuit for causing the piezoelectric element to vibrate so as to generate vibrational waves, wherein the volume of the piezoelectric element is determined based on density of the piezoelectric element, mass of the optical element, and vibration speed of the optical element, and made a size such that there is no wasteful consumption of energy.

11 Claims, 10 Drawing Sheets

DIGITAL CAMERA AND DUST REDUCTION APPARATUS FOR DIGITAL CAMERA

Benefit is claimed under 35 U.S.C. §119, to the filing date of U.S. provisional patent application Ser. No. 60/842,227, titled "Digital Camera And Dust Reduction Apparatus For Digital Camera," filed on Sep. 5, 2006, listing Sumio KAWAi as inventor, for any inventions disclosed in the manner provided by 35 U.S.C. §112, ¶1. This application is expressly incorporated herein by reference. The scope of the present invention is not limited to any requirements of the specific embodiments described in the application.

BACKGROUND OF THE INVENTION

1. Field of the Invention

The present invention relates to a digital camera having a dust reduction function, and to a dust reduction apparatus fitted to a digital camera.

2. Description of the Related Art

With a digital camera that acquires image data by making a subject image formed by a photographing lens incident on an image sensor, if dust is attached to optical elements such as the imaging surface of the image sensor, or protective glass etc, arranged in front of the imaging surface, shadows of the dust show up in images, spoiling their appearance. There have therefore been various proposals for digital cameras having a so-called dust reduction function, where an optical element for dust protection such as a glass plate for hermetically sealing the image sensor, a low pass filter, an infra-red cut filter etc., is arranged between the photographing lens and the image sensor, and dust that has become attached to the dust protection optical element is removed by subjecting the dust protection optical element itself to ultrasonic vibration.

For example, Japanese patent laid-open No, 2003-338965 (Laid open Nov. 28, 2003) discloses a digital camera that removes dust by arranging an annular piezoelectric element at a peripheral edge of a surface of a circular dust protection optical element that is orthogonal to the optical axis, and applying an alternating current to this piezoelectric element to cause vibration, thus generating vibrational waves in the dust protection optical element. Also, Japanese patent laid-open No. 2002-204379 (laid-open Jul. 19, 2002), discloses a digital camera that removes dust by arranging a pair of piezoelectric elements at the top and bottom or left and right of a rectangular dust protection optical element, and generating vibrational wave in the dust protection optical element.

SUMMARY OF THE INVENTION

An object of the present invention is to provide a digital camera having a dust reduction function that is small in size and low in cost.

A digital camera of the present invention comprises an image sensor for imaging a subject image formed by a photographing lens, an optical element provided between the photographing lens and the image sensor, a piezoelectric element arranged on the optical element, and an oscillation circuit for causing the piezoelectric element to vibrate so as to generate vibrational waves in the optical element for dust protection, wherein the volume of the piezoelectric element is determined based on density of the piezoelectric element, mass of the optical element, and vibration speed of the optical element.

Also, a dust reduction apparatus of the present invention comprises an optical element, a piezoelectric element arranged on the optical element, and an oscillation circuit for causing the piezoelectric element to vibrate so as to generate vibrational waves in the optical element, wherein the volume of the piezoelectric element is determined based on density of the piezoelectric element, mass of the optical element, and vibration velocity of the optical element.

DETAILED DESCRIPTION OF THE INVENTION

In the following, preferred embodiments using a digital single lens reflex adopting the present invention will be described using the drawings. First, a dust removal method of this embodiment will be described, before detailed description of a digital single lens reflex camera of the first embodiment.

Figure 1:
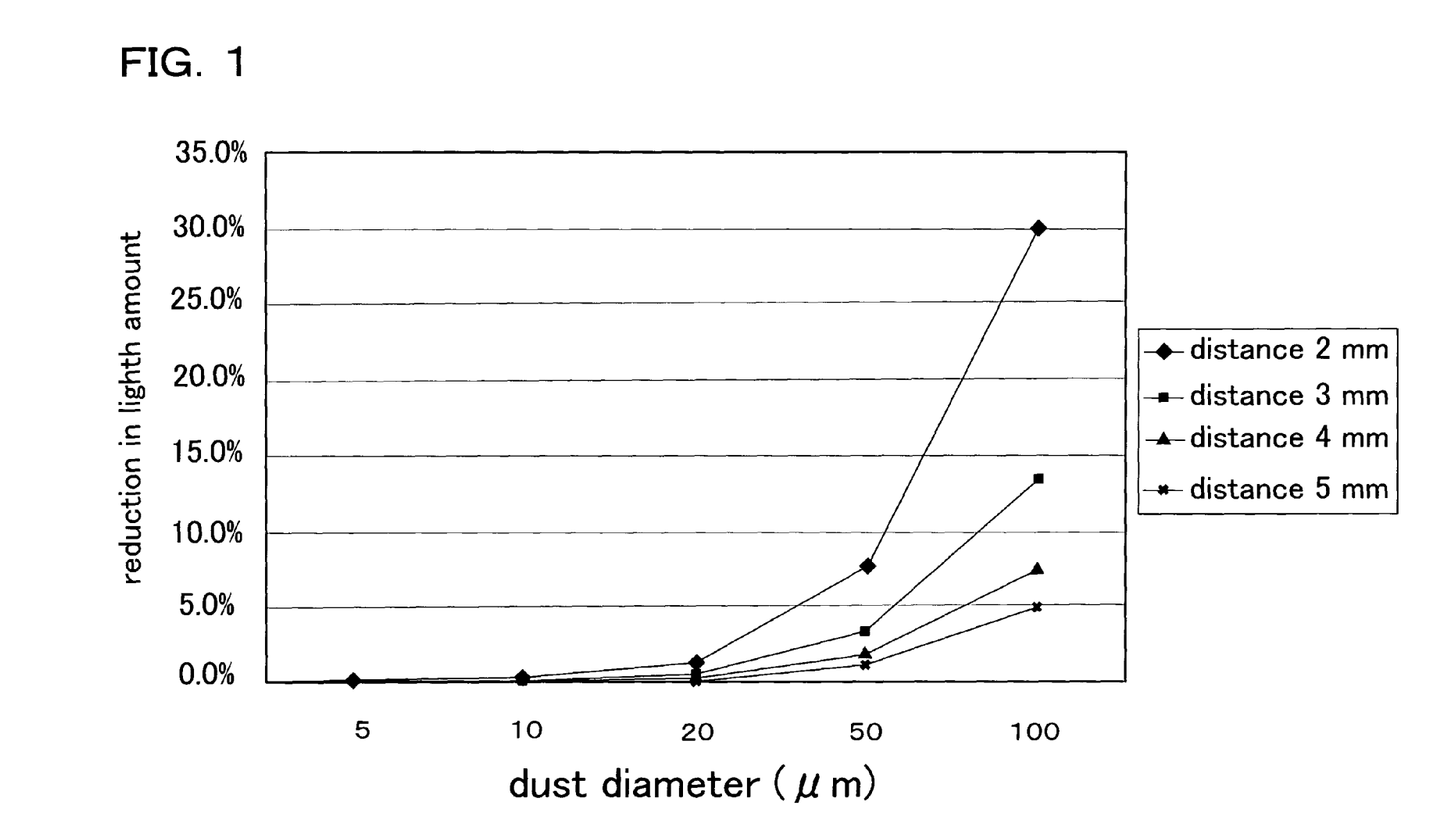
FIG. 1 is a graph showing a relationship between diameter of dust particles and reduction in light amount.
Figure 2:
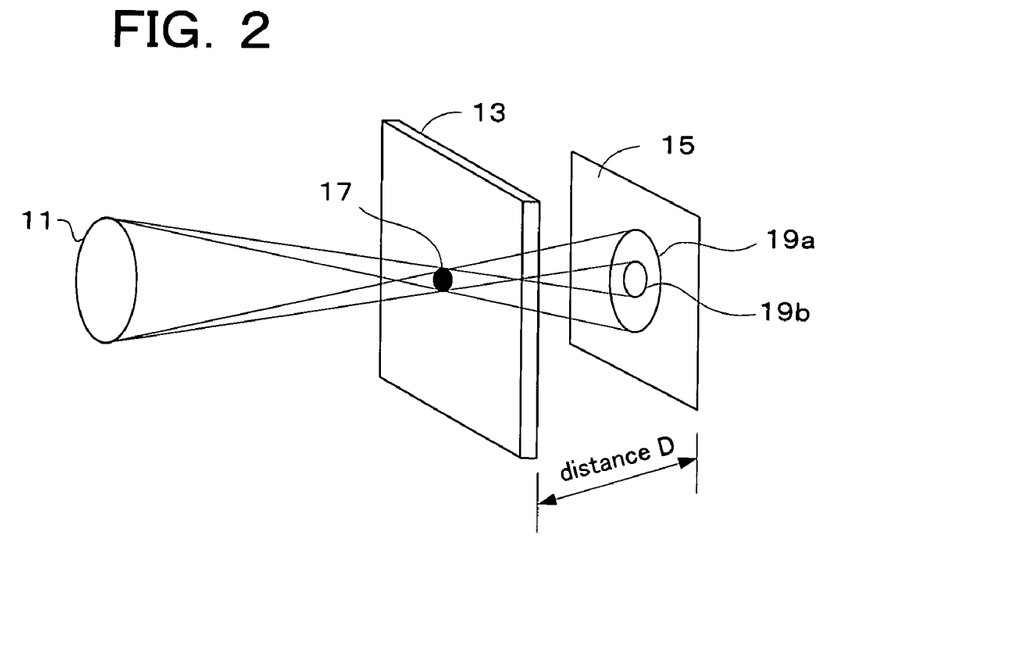
FIG. 2 is a schematic diagram showing a relationship between dust particles on an image sensor and shadows on an image plane.

FIG. 1 is a graph showing a relationship between dust diameter and reduction in light amount, with diameter of dust shown on the horizontal axis and extent of reduction in light amount incident on the image sensor because of dust shown on the vertical axis. As shown in FIG. 2, an image is formed on an image plane 15 by a lens 11. Consider a case where a piezoelectric element 13 such as a low pass filter is arranged between the lens 11 and the image plane (image surface) 15, and dust 17 becomes attached to the surface of this piezoelectric element 13. In this case, shadows 19a and 19b are formed on the image plane 15 by the dust 17. The amount of light from the lens 11 is reduced by these shadows, but lowering of light amount varies according to size of the dust, distance D between the optical element 13 to which dust is attached and the image plane, and F number (aperture value) of the lens 11.

FIG. 1 shows a case where the F number of the lens 11 is F11, and when the distance D between the optical element 13 and the image sensor (arranged on the image plane) is 5 mm, even if dust diameter is 100 µm reduction in light amount is about 5%, and is not a problem in practical terms. However, with dust diameter of 100 µm, at a distance D of 4 mm reduction in light amount is about 7%, at a distance of 3 mm reduction in light amount is about 13%, and at a distance D of 2 mm reduction in light amount becomes 30%. A dust reduction function is therefore necessary when it is not possible to make the distance D sufficiently short. Incidentally, when the diameter of dust is even larger, the dust reduction function is not necessary because the dust will fall under its own weight when carrying out dust removal.

In this embodiment, dust removal involves vibrating a surface of an optical element, and utilizing force due to acceleration at that time so that dust falls. Next, description will be given regarding the relationship between force due to acceleration and dust removal.

The major forces attracting dust to attach to an optical element such as a low pass filter are electrostatic force and intermolecular force. If conductive processing is performed on the surface of the optical element and the surface is connected to ground, charge of the optical element is removed, and so there is no attractive force due to electrostatic force.

On the other hand, intermolecular force is an electrical attractive force caused because molecules themselves have electrical polarity. Therefore, even if conductive processing is carried out, intermolecular force exists. Intermolecular force is represented as follows.

$$Fv = -A/(12Z^2) \cdot X \quad (1)$$

Here, A is the Hamaker constant, and X is particle diameter of the dust. The particle diameters X of this dust are, for example:

carbohydrate $4 \times 10^{-20} \sim 10 \times 10^{-20}$ [J]

Oxide $6 \times 10^{-20} \sim 15 \times 10^{-20}$ [J]

Metal $15 \times 10^{-20} \sim 50 \times 10^{-20}$ [J]

It will be understood that in this manner intermolecular force is larger in metal, which is conductive, and that for intermolecular force, conductive processing has no effect.

Figure 3:
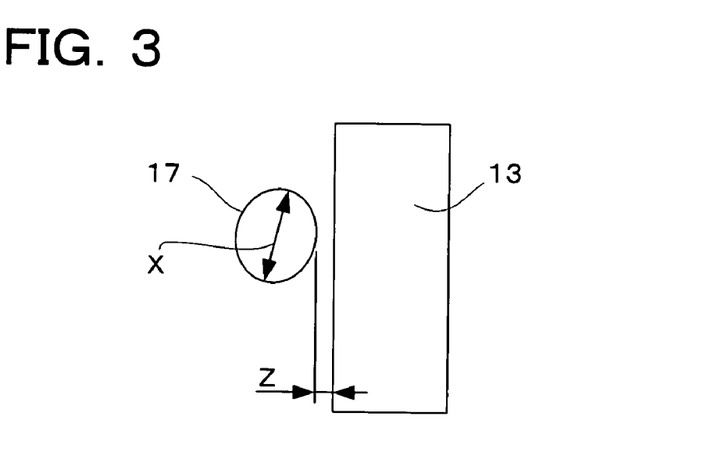
FIG. 3 is a schematic drawing showing a relationship between dust and the image sensor.

Also, in the above equation (1), Z is a surface distance at a molecular level between the dust particle 17 and the optical element 13 as shown in FIG. 3. Normally, particles of dust come into contact macroscopically with the surface of the optical element, but in actual fact a distance between the dust particles and the surface is kept at a distance of a few nanometers or less by intermolecular force.

In this way dust is mainly attached to the optical element by intermolecular force, but in removing dust utilizing acceleration caused by vibration, the following equation (2) should be satisfied. Specifically, if force applied to the dust due to acceleration is made Fα, this force Fα should be made larger than intermolecular force Fv.

$$Fv < F\alpha \quad (2)$$

This force Fα on the dust due to acceleration is obtained from the following equations (3) and (4).

$$F\alpha = (\pi/6) \cdot X^3 \cdot \rho \cdot (d^2 u/dt^2) \quad (3)$$

$$u = B \sin \omega t \quad (4)$$

Where:
X: particle diameter of dust
ρ: density of dust
u: function representing the position function of dust
t: time
ω: angular frequency ω=2πf here, f: frequency
B: amplitude Since an optical element such as a low pass filter vibrates at close to sine wave vibration due to vibration of a piezoelectric body, it is possible to obtain the above equation (4). Incidentally, it is not possible to instantaneously displace an elastic body in a rectangular pulsed manner, and even if hit with a hammer output vibration will be a sine wave.

From equations (3) and (4) above we get $$F\alpha = -(\pi/6) \cdot X^3 \cdot \rho \cdot (B \cdot \omega^2 \sin \omega t) \quad (5)$$

$$= -(\pi/6) \cdot X^3 \cdot \rho \cdot B \cdot (4\pi^2 f^2) \cdot \sin(2\pi f \cdot t) \quad (6)$$

From equation (6), it will be understood that in shaking off dust (having a specified diameter X) that is attached to the optical element by intermolecular force Fv using force Fα due to acceleration, it is preferable to make the vibration frequency high. It will also be understood that increasing the amplitude B also increases the effect.

Next, vibrational energy Pk in the case where vibration is generated in the optical element becomes $$Pk = (Mk \cdot vk^2)/2 \quad (7)$$

Where:
Mk: equivalent mass of optical element
vk: vibration velocity of optical element If the vibration velocity Vk of the optical element is made a velocity that is a time differentiation of equation (4), then $$vk = (2\pi f) \cdot B \sin(2\pi f \cdot t) \quad (8)$$

Vibrational energy Pk is proportional to the mass Mk of the optical element, and so it is preferable to have the mass of the optical element as light as possible. Making the optical element small in size or using a material with low density are both effective.

A piezoelectric body (piezoelectric element) is effective for generating wave vibration such a sine wave vibration as described above. The piezoelectric body is capable of directly generating high frequency vibration of a MHz level, and vibrational energy that can be generated per unit volume is large, so it is possible to generate a frequency that is sufficiently high to shake of dust from the surface of the optical element with a piezoelectric body of small volume. If a voltage having a frequency is applied to the piezoelectric body, the piezoelectric body expands and contracts according to the material constant of the piezoelectric body, to generate sine wave vibration. The vibrational energy Pa at this time is $$Pa = (Ma \cdot va^2)/2 \quad (9)$$

Where:
Ma: equivalent mass of the piezoelectric body
va: vibration velocity of the piezoelectric element Obviously, since there is a need for the vibration energy of the piezoelectric body to be larger than the vibration energy of the optical element, $$Pk<Pa \quad (10)$$

Also, the vibration velocity va of the piezoelectric body is made a velocity that is a time differentiation of equation (4), then $$va=(2\pi f)\cdot B\sin(2\pi f\cdot t) \quad (11)$$

If a specified frequency f and amplitude B are placed in the second term of equation (11), it is possible to determine vibration velocity va of the piezoelectric body and obtain energy of the piezoelectric body in equation (9). The volume of the piezoelectric body required to give a specified vibration energy is roughly determined from the fact that the density of the material of the piezoelectric body is generally 7-8 g/cm$^3$. Using a piezoelectric body of a volume obtained in this manner gives good efficiency, and it is possible to make a dust removing mechanism achieving the desired dust removing effect that is small in size.

Next, calculation of specific values will be discussed. From the graph of FIG. 1, when an air conversion optical path length (value calculated in the optical path length inside the optical element) from the image plane 15 to the optical element 13 is 4 mm, the diameter of dust attached to the optical element surface that causes a reduction in light amount of 5% or more is 100 μm (light reduction amount of 7%). In this case, shadows of the dust will show up on the image sensor.

If the dust is made spherical glass powder, then, if
Hamaker constant A=1×10$^{-19}$ J
space between the dust and the optical element 13, Z=1 nm, and
dust diameter X=0.1 mm, then
intermolecular force Fv is $$Fv=-8.3\times 10^{-7} N$$

while on the other hand, with respect to inertial force Fα, if
vibration frequency fk=30 kHz, and
amplitude B=20 μm, then
maximum vibrational velocity vmax=4 m/sec, and resultantly a maximum value for inertial force becomes $$F\alpha max=8.93\times 10^{-7} N$$

In this state, if Fv<Fα at the point in time where absolute values of Fv and Fα are obtained, dust on the optical element can be removed.

At this time, element pitch of the image sensor is made 6 μm, and a four point separation low pass filter used as the optical element has a cut-off frequency for spatial frequency regulated by the element pitch of the image sensor. Incidentally, this low pass filter is made from a combination of a 0° plate having separation direction in the horizontal direction, a depolarization plate (phase plate) having a thickness of about 1 mm, and a 90° plate having a beam separation direction in the vertical direction. The 0° plate is independently separated, and the 90° plate vibrates as an optical element. If the size of the image sensor at this time is made 23.7 mm×15.6 mm, or 22.7 mm×15.1 mm, the size of the optical element becomes 26.5×19×1.02 mm. The density of crystal (quartz) used as material for the low pass filter has ρ=2.635~2.66 g/cm$^3$, so the mass becomes
mass of optical element Mk=1.35~1.37 g
Since maximum vibrational velocity is 4 m/sec, if an average velocity of 2 m/sec is assumed,
vibration energy becomes P=2.7×10$^{-3}$ J On the other hand, f the material of the piezoelectric body is made a hard type of lead zirconate titanate, then
density ρ=7.7 g/cm$^3$
and taking into consideration the voltage and frequency applied to the piezoelectric body, if a vibrational velocity va capable of being generated by a layered piezoelectric body is made $$va=3.5 \text{ m/sec}$$

then to give the above described vibration energy of Pk or greater, volume is preferably made $$Vp=57\sim 58 \text{ mm}^3$$

Here, the fact that volume Vp is in a range is because density of the crystal (quartz) has a range, and the minimum volume Vp is also determined when the density of the liquid crystal used is determined.

In this manner, minimum volume of the piezoelectric body that can remove dust that has become attached to the optical element is obtained. Accordingly, it is possible to anticipate reduction in size in a range required if actual volume of the piezoelectric body is determined based on design values.

Incidentally, the type of material that can be used for the piezoelectric body and low pass filter is limited, and if the above conditions are generalized, if the volume of the optical element is made Vk, it is preferable for (Vk/β)<Vp to be satisfied. According to the above described conditions, β<9.

Also, in improving the dust reduction effects, the volume of the piezoelectric body is preferably make larger, but even if L<l, it is not possible to convey the vibration of the piezoelectric body efficiently to the optical element, and so is pointless. Accordingly, it is desirable to settle on the condition that L≧l.

Figure 4:
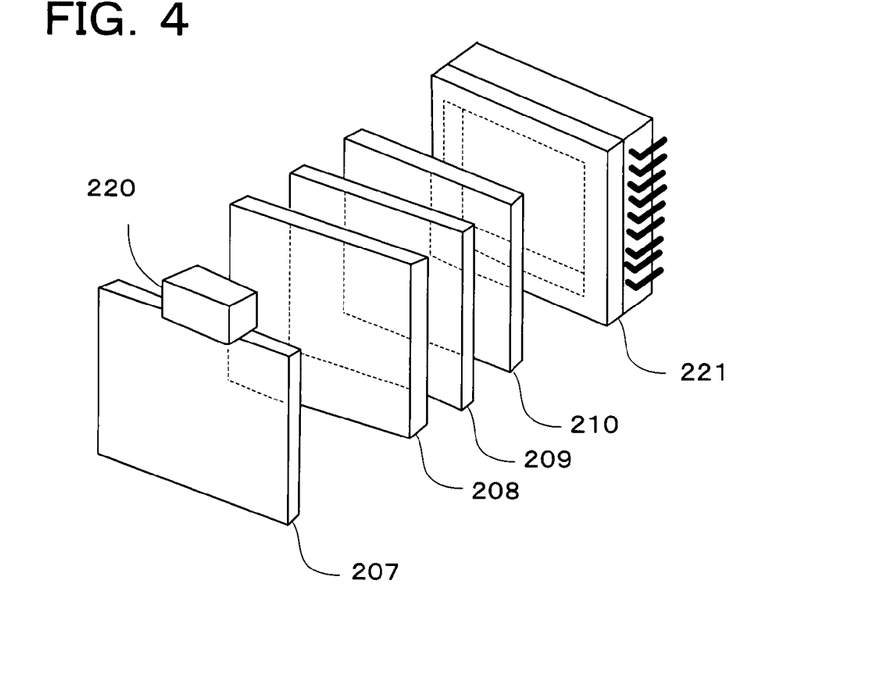
FIG. 4 is an exploded perspective view showing the structure of an image sensor, dust protection optical element, and piezoelectric element of a first embodiment of the present invention.

Next, the structure of the dust removing optical element and the piezoelectric body of one embodiment of the present invention will be described using FIG. 4. An image sensor 221 is a two-dimensional image sensor such as a CCD (Charge couple device) or CMOS (Complementary Metal Oxide semi-conductor), and is an element for receiving light if a subject image formed by a photographing lens, subjecting this light to photoelectric conversion, and outputting subject image signals. In front of this image sensor 221, a low pass filter and infrared cut filter are arranged as optical elements. In this embodiment, the low pass filter is comprised of the first low pass filter 207, a phase plate 208, and the second low pass filter 210, with the respective members being rectangular flat plates. Here, the first low pass filter is constructed as a 0°plate while the second low pass filter is constructed as a 90°plate. The low pass filter made up of these plates removes a high frequency component from the subject light flux, and subject light flux low frequency components are conveyed to the image sensor 221. An infrared cut filter 209 arranged between the phase plate 208 and the second low pass filter 210 is a filter for removing infrared light.

Figure 5:
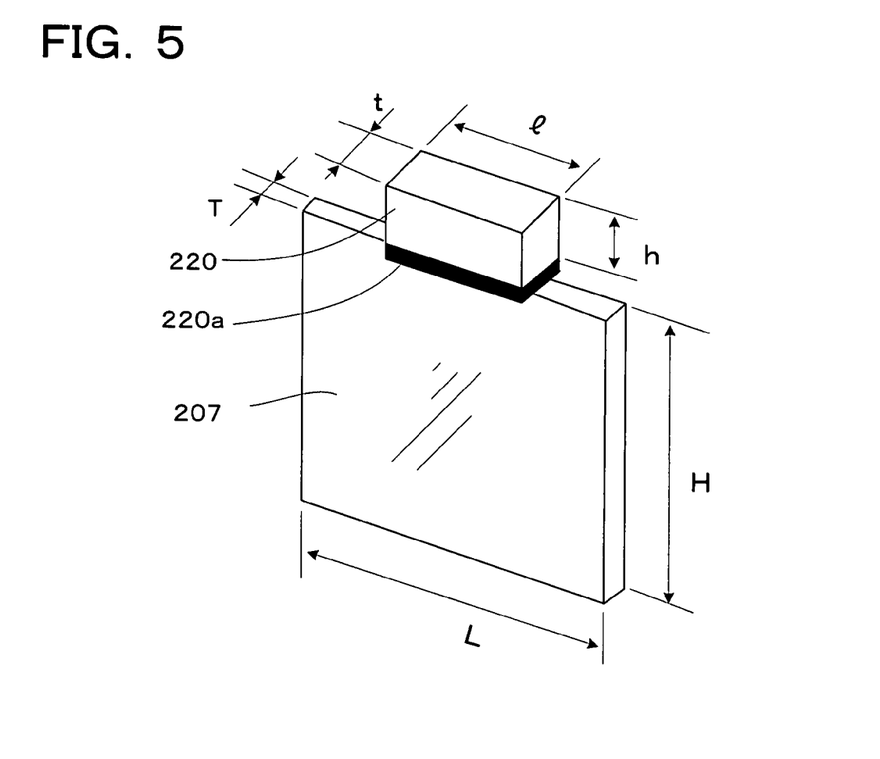
FIG. 5 is a perspective view showing the structure of the dust protection optical element and piezoelectric element of the first embodiment of the present invention.

As shown in FIG. 5, a vibration transmitting body 220a of the piezoelectric element (piezoelectric body) 220 is arranged at an upper side end section of the first low pass filter 207 having a function as an optical element for dust reduction, so as to be orthogonal to the plane of the first low pass filter. Incidentally, it is also possible to arrange the piezoelectric element 220 on the planar section of the first low pass filter, but in this case a first low pass filter having a large surface area is required, which may increase the cost. On the other hand, by arranging at the end section, the first low pass filter 207 has the minimum size required.

When the surface of the piezoelectric element 220 expands and contracts, if the piezoelectric element 220 is not in constant contact with the first low pass filter 207, vibration can not be efficiently transmitted to the first low pass filter 207. Therefore a vibration transmitting body 220a, being an impedance matching member for efficiently transmitting vibration, is constructed of a metal with a good acoustic transfer characteristic, such as, for example, brass, aluminium, iron etc.

Here, if the first low pass filter 207, as an optical member for dust reduction, has
width L: 26.5 mm
height H: 19 mm
thickness T: 1.02 mm (when pixel pitch of the image sensor is 6 μm)
density $\rho$: 2.635~2.66 g/cm$^3$
mass M: 1.32~1.33 g
then in satisfying the condition of above equation (10) the piezoelectric element 220 preferably has a size expressed by the following.
width l: 10 mm
height h: 3 mm
thickness t: 2 mm
density $\rho$: 7~8 g/cm$^3$ In this way, in this embodiment, the piezoelectric element 220 is made such a size that there is no wasting of energy when removing dust. Also, as a result, it is possible to make the piezoelectric element 220 small, and it is possible to provide a dust reduction apparatus cheaply and small in size.

Figure 6A:
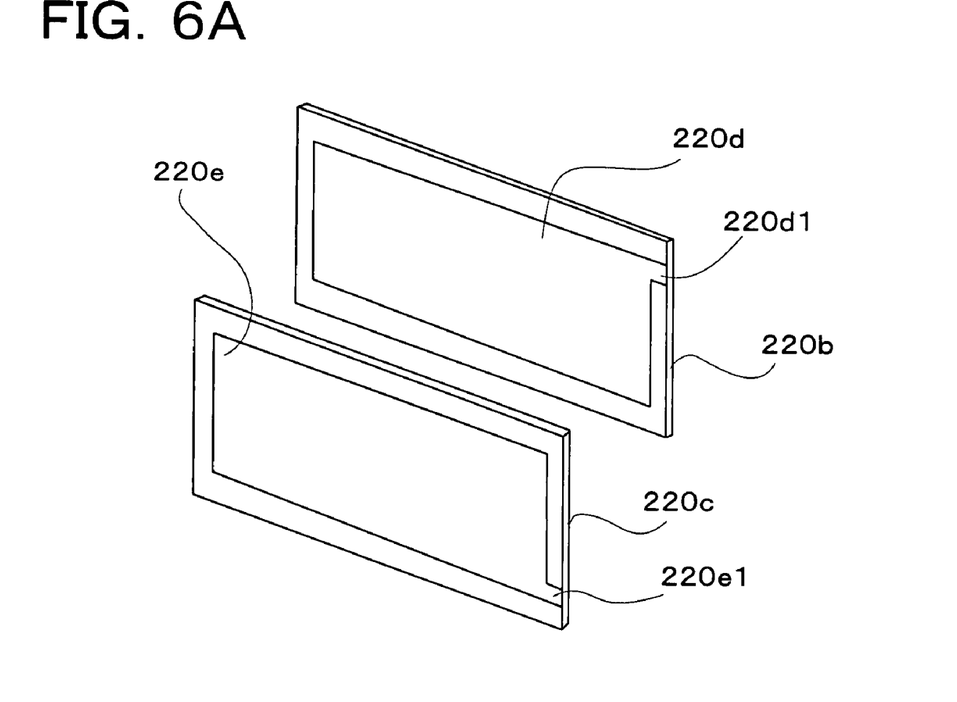
FIG. 6A is a perspective view showing components constituting the piezoelectric element of the first embodiment of the present invention.
Figure 6B:
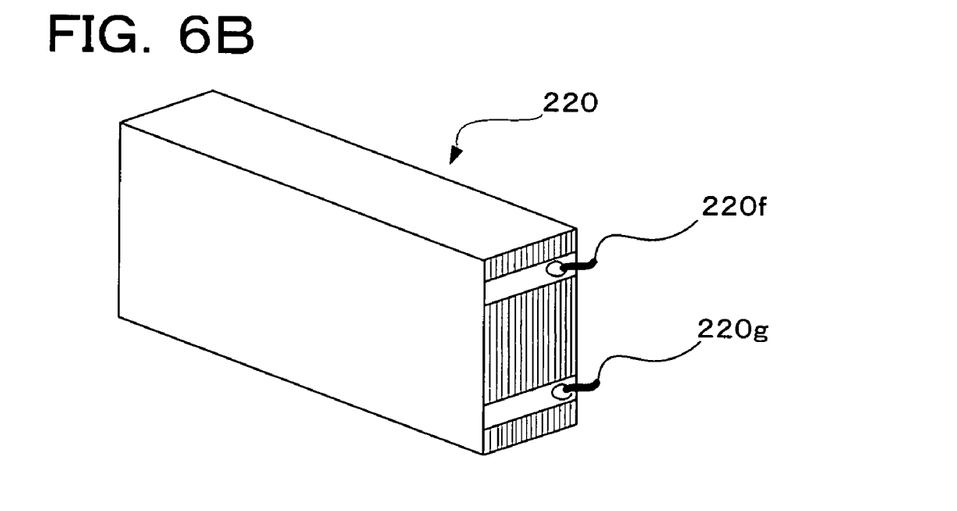
FIG. 6B is a perspective view showing the piezoelectric element of the first embodiment.

Next, the structure of the piezoelectric element 220 is shown in FIG. 6A and FIG. 6B. The piezoelectric element 220 is constructed by laminating single plates A 220b and single plates B 220c, made from a piezoelectric material, into a multiple sheet laminate. As shown in FIG. 6A, the single plate A 220b and the single plate B 220c are respectively provided with an electrode A 220d and an electrode B 220e at planar sections. An electrode take-out opening 220d1 of the electrode A 220d of the single plate A 220b is provided at an upper side edge of the plate, and an electrode take-out opening 220e1 of the single plate B 220c is provided at a lower side edge of the plate. As shown in FIG. 6B, the single plates A 220b and the single plates B 220c are alternately stacked, with the electrode take-out openings 220d1 provided on the upper parts coming together to form an electrode, and a lead line 220f being provided on this electrode, while the electrode take-out openings 220e1 provided on the lower parts come together to form an electrode, and a lead line 220g is provided on this electrode. By constructing the piezoelectric element 220 in this manner, if alternating voltage of differing voltage is applied to the electrode A 220d and the electrode B 220e through the lead line 220f and the lead line 220g, the piezoelectric element 220 is subjected to expansion and contraction to vibrate.

Figure 7:
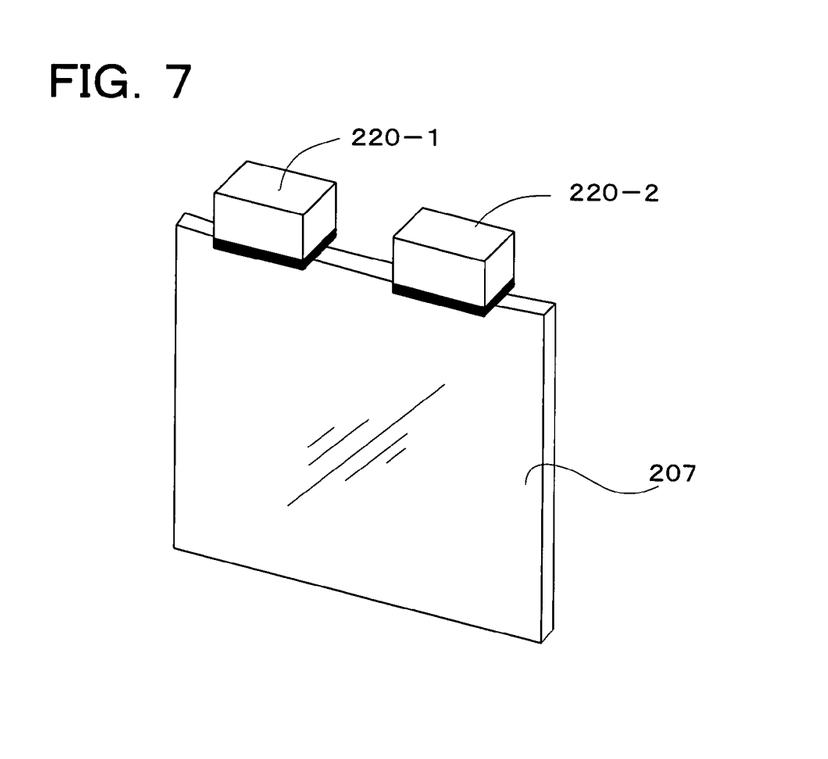
FIG. 7 is a perspective view showing a first modified example of the structure of the dust protection optical element and piezoelectric element of the first embodiment of the present invention.

As described above, with this embodiment a single piezoelectric element 220, constructed having a volume that satisfies the equations (10) and (11) above, is arranged at an upper edge section of the first low pass filter 207. However, the form of the piezoelectric element 220 is not limited to the form shown in FIG. 4 and FIG. 5, and various modifications are possible. For example, as shown in FIG. 7, it is possible to divide into a plurality of piezoelectric bodies 220-1, 220-2, and arrange them on the first low pass filter 207, which is an optical element. In this case, as long as the total volume of the piezoelectric bodies 220-1 and 220-2 satisfies the above-described equations there is also no wasteful consumption of current, and it is possible to achieve reduction in size.

Figure 8:
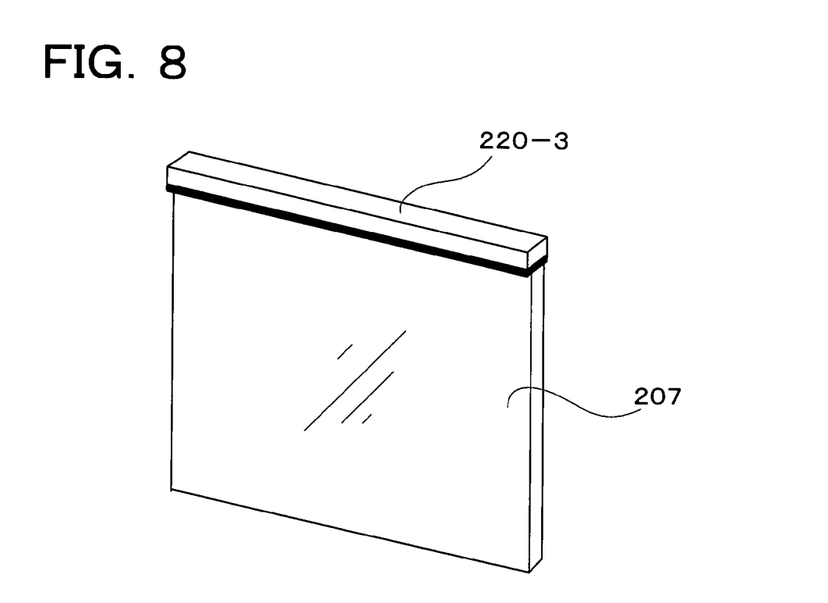
FIG. 8 is a perspective view showing a second modified example of the structure of the dust protection optical element and piezoelectric element of the first embodiment of the present invention.

Also with this embodiment, the width l of the piezoelectric element 220 is narrower than the width L of the first low pass filter 207, but as shown in FIG. 8 it is also possible to provide a piezoelectric body 220-3 that is substantially the same width as the first low pass filer 207. If the width is made substantially the same, as with the piezoelectric element 220-3 of this modified example, it is possible to more efficiently transmit the vibration of the piezoelectric element 220 to the optical element.

Figure 9:
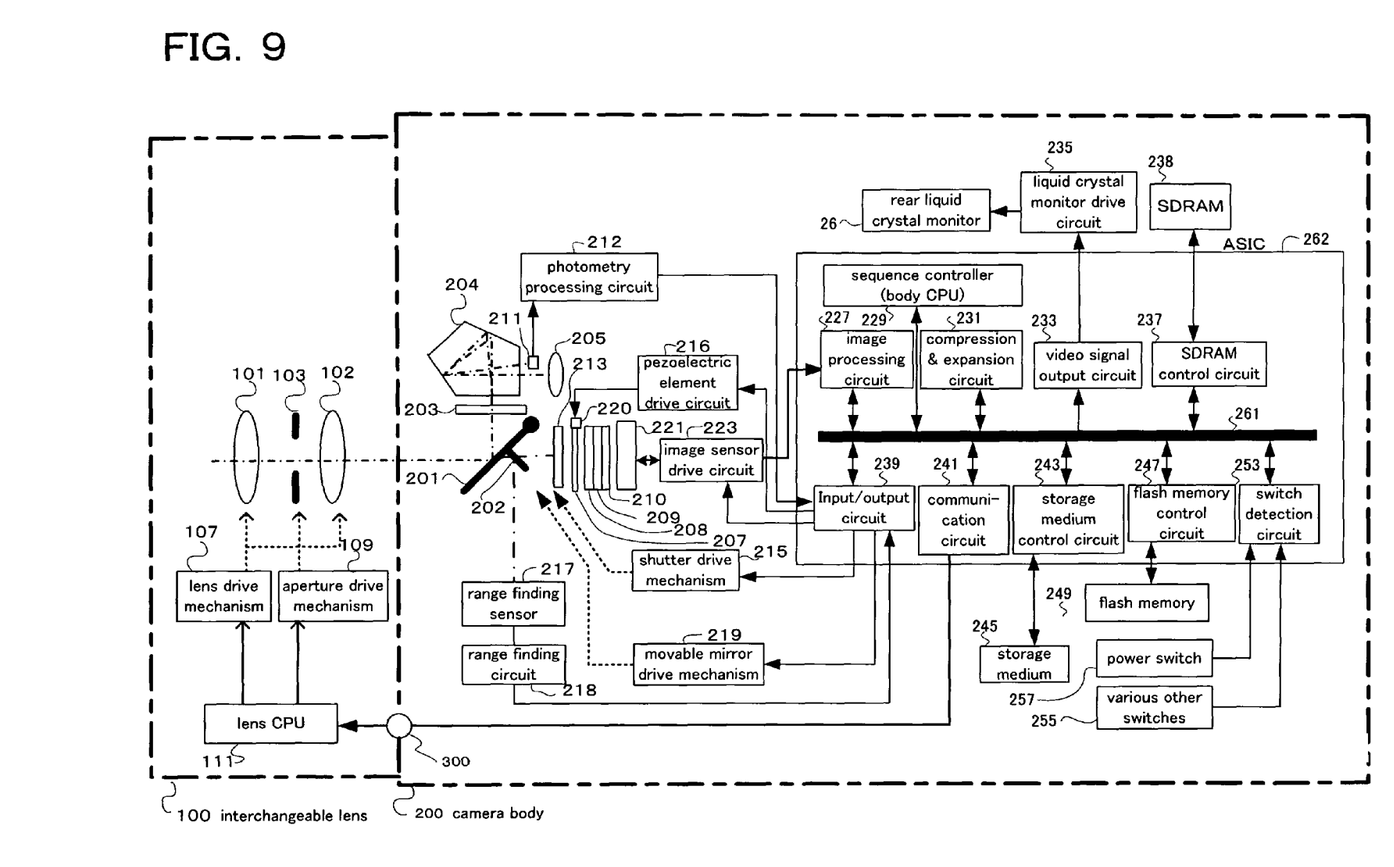
FIG. 9 is a block diagram showing the overall structure of a digital single lens reflex camera of the first embodiment of the present invention.

Next, description will be given mainly of the electrical systems of the digital single lens reflex camera of this embodiment of the present invention, using FIG. 9. The digital single lens reflex camera relating to an embodiment of the present invention comprises an interchangeable lens 100 and a camera body 200. The interchangeable lens 100 is removably attached to mount opening section (not shown) on the front of the camera body 200. Subject light that is formed by a photographing lens comprised of lenses 101, 102 etc. within the interchangeable lens 100 passes through the mount opening section and is guided into the camera body 200. Within this embodiment, the interchangeable lens 100 and the camera body 200 are constructed separately, and the two are electrically connected by a communication contact 300.

Lenses 101 and 102 for focusing and focal length adjustment, and an aperture for adjusting aperture, are arranged inside the interchangeable lens 100. The lens 101 and the lens 102 are driven by a lens drive mechanism 107, while the aperture 103 is driven by the aperture drive mechanism 109. The lens drive mechanism 107 and the aperture drive mechanism 109 are respectively connected to a lens CPU 111, and this lens CPU 111 is connected to the camera body 200 by means of the communication contact 300. The lens CPU 111 performs control of the inside of the interchangeable lens 100, and performs focusing and zoom operations by controlling the lens drive mechanism 107, and control of an aperture value by controlling the aperture drive mechanism 109.

Inside the camera body 200, a rotatable movable mirror 201 is provided moving between a position inclined by 45 degrees with respect to the lens optical axis for reflecting a subject image to a viewfinder optical system and a raised up position for guiding the subject image to the image sensor 221. A focusing screen 203 for image forming the subject image is arranged above this movable mirror 201, and a pentaprism 204 for lateral inversion of the subject image is arranged above this focusing screen 203. An ocular lens 205 for viewing the subject image is arranged at an outgoing side of this pentaprism 204 (the right side in FIG. 9), and a photosensor 211 is arranged next to the ocular lens at a position that does not obstruct viewing of the subject image.

A half mirror is constructed close to the middle of the movable mirror 201, and a sub-mirror 202 for reflecting the subject image that has passed through the half mirror to a lower section of the camera body 200 is provided on a rear surface of the movable mirror 201. This sub mirror 202 is capable of rotation with respect to the movable mirror 201, and when the movable mirror 201 is in the up position the sub mirror 202 rotates to a position covering the half mirror part, while when the movable mirror 201 is in a subject image viewing position the sub-mirror 202 is at a position perpendicular to the movable mirror 201, as shown in the drawing. This movable mirror 201 is driven by a movable mirror drive mechanism 219. Also, a range finding sensor 217 is arranged below the sub-mirror 202, and output of this range finding sensor 217 is connected to a range finding circuit 218. These circuits are circuits for measuring amount of slip in focus of the subject image formed by the lenses 101 and 102.

A focal plane type shutter 213 for exposure time control is arranged behind the movable mirror 201, and drive control for this shutter 213 is performed by a shutter drive mechanism 215. An image sensor 221 is arranged behind the shutter 213, and a subject image formed by the lenses 101 and 102 is photoelectrically converted into electrical signals.

The previously mentioned low pass filter 207, phase plate 208, infrared cut filter 209 and second low pass filter 210 are arranged between the shutter 213 and the image sensor 221. The image sensor 221, first low pass filter 207, phase plate 208, infra-red cut filter 209, and second low pass filter 210 are integrally housed in a hermetically sealed passage constructed so that dust can not infiltrate inside the package.

The previously described piezoelectric element 220 is arranged at the upper edge section of the first low pass filter 207, and a piezoelectric element drive circuit 216 is connected to the read lines 220f and 220g (refer to FIG. 6B) of this piezoelectric element 220. This piezoelectric element drive circuit 216 is a circuit for outputting drive signals for vibrationally driving the piezoelectric element 220 at a specified frequency. These operations will be described in detail later using FIG. 10.

The image sensor 221 is connected to an image sensor drive circuit 223, and is drive controlled by control signals from an input/output circuit 239. Photoelectric analog signals output from the image sensor 221 are amplified by the image sensor drive circuit 223 and subjected to analog to digital conversion (AD conversion). The image sensor drive circuit 223 is connected to an image processing circuit 227 inside an ASIC (Application specific integrated circuit) 262, and various image processing such as digital amplification of digital image data (digital gain adjustment processing), color correction, gamma (γ) correction, contrast correction, monochrome/color mode processing, through image processing and image processing for storage medium storage etc. are carried out by this image processing circuit 227. The image processing circuit 227 is connected to a data bus 261. Besides the image processing circuit 227, components that will be described later, such as a sequence controller (hereafter referred to as a body CPU) 229, compression and expansion circuit 231, video signal output circuit 233, SDRAM control circuit 237, input/output circuit 239, communication circuit 241, storage medium control circuit 243, flash memory control circuit 247 and switch sensing circuit 253 are connected to this data bus 261.

The body CPU 229 that is connected to the data bus 261 controls operation of this digital camera. Also, the compression and expansion circuit 231 connected to the data bus 261 is a circuit for compressing image data stored in the SDRAM 238 in compression formats used for still images and moving images, such as JPEG, MJPEG (Motion JPEG) etc. The image compression is not limited to JPEG and MJPEG, and it is also possible to apply other compression methods. The video signal output circuit 233 connected to the data bus 261 is connected to a rear liquid crystal monitor 26 via a liquid crystal monitor drive circuit 235. The video signal output section 233 converts image data stored in the SDRAM 238 or the storage medium 245 into video signals for display on the rear liquid crystal monitor 26.

The rear liquid crystal monitor 26 is arranged on the rear surface of the camera body 200, but as long as it is in a position that can be seen by the photographer it is not limited to the rear surface, and also is not limited to liquid crystal and can be another display device. The SDRAM 238 is connected via the SDRAM control circuit 237 to the data bus 261, and this SDRAM 238 acts as a buffer memory for temporarily storing image data that has been subjected to image processing by the image processing circuit 227 or image data that has been compressed by the compression and expansion circuit 231. The input/output circuit 239 connected to the above described photometry processing circuit 212, shutter drive mechanism 215, piezoelectric element drive circuit 216, ranging circuit 218, movable mirror drive mechanism 219, and image sensor drive circuit 223 controls input and output of data to various circuits, such as the body CPU 229 via the data bus 261. The communication circuit 241 that is connected to the lens CPU 111 via the communication contact 300 is also connected to the data bus 261, and carries out data exchange with the body CPU 229 etc. and communication for control commands.

The storage medium control circuit 243 connected to the data bus 261 is connected to the storage medium 245, and performs control of storage such as image data to this storage medium 245. The storage medium 245 is constructed so that any rewritable storage medium, such as xD picture card (registered trademark), compact Flash (registered trademark), SD memory card (registered trademark) or memory stick (registered trademark) can be fitted, and is removably inserted into the camera body 200. Besides this, it is also possible to have a structure capable of connecting a hard disk unit, such as a microdrive (registered trademark) or a wireless communication unit.

The flash memory control circuit 247 connected to the data bus 261 is connected to a flash memory 249, and this flash memory 249 holds programs for controlling flow of camera operations, and the body CPU 229 performs control of the digital camera in accordance with the programs stored in the flash memory 249. Incidentally, the flash memory 249 is an electrically rewritable non-volatile memory.

Various switches 255, such as a power switch 257 for turning the camera on and off, linking to a power on switch lever for controlling supply of power to the camera body 200 and the lens 100, a switch linking to the shutter release button, a switch linking to the playback button for instructing playback mode, a switch linking to a cross-shaped key for instructing movement of a cursor on the screen of the rear liquid crystal monitor 26, a switch linking to the mode dial for instructing exposure modes, an OK switch linking to the OK button for deciding various selected modes etc. and an attachment detection switch, are connected to the data bus 261 via a switch sensing circuit 253.

Incidentally, the release button has a first release switch that turns on if the photographer presses the button down halfway, and a second release switch that is turned on when the button is pressed down fully. The camera carries out exposure preparation operations, such as focal point detection, focusing of the photographing lens, and light measurements for the subject brightness, as a result of this first release switch (hereafter called 1R) being turned on, and if the second release switch (hereafter called 2R) is turned on, an exposure operation is carried out to acquire image data for a subject image based on output of an image sensor.

Figure 10:
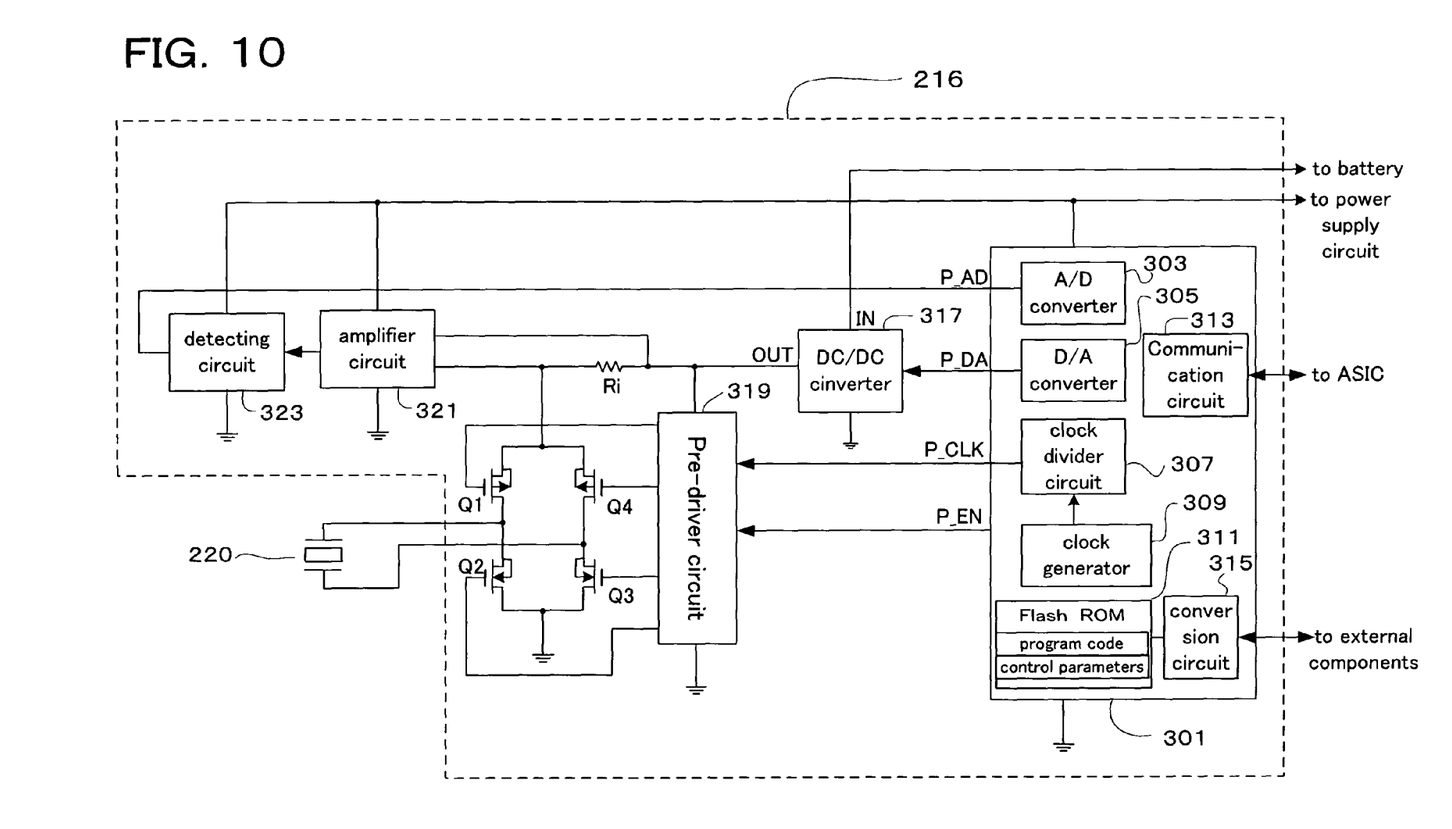
FIG. 10 is a block diagram showing the circuit structure of a piezoelectric element drive circuit of the first embodiment of the present invention.

Next, the piezoelectric element drive circuit 216 will be described using FIG. 10. A microcomputer 301 inside the piezoelectric element drive circuit 216 executes control of the piezoelectric element drive circuit 216 according to commands from the ASIC 262. Communication with the ASIC 216 is carried out by means of a communication circuit 313 inside the microcomputer 301 and an input/output circuit 239 inside the ASIC 262. An A/D converter 303 is a circuit for measuring drive current of the piezoelectric element 220, and is input with a voltage corresponding to a current value from a P_AD terminal. A D/A converter 305 is a circuit for measuring drive voltage of the piezoelectric element 220, and outputs a drive voltage from a P_DA terminal.

A clock division circuit 307 and a clock generator 309 set a drive frequency to be supplied to the piezoelectric element 220, and a pulse signal corresponding to the drive frequency is output from P_CLK. A Flash ROM 311 stores program code and control parameters for execution by the microcomputer 301. The program code and control parameters stored in the Flash ROM 311 can be rewritten by a rewriting circuit 315. This rewriting is performed using commands from an external unit connected to the camera, such as a personal computer for example.

A DC/DC converter 317 is connected between a power supply battery and ground, and outputs a voltage according to a drive voltage set by the D/A converter 305, this voltage being output via a resistance Ri to a bridge circuit comprised of transistors Q1, Q2, Q3 and Q4. Output voltage of the DC/DC converter 317 can therefore be controlled by the P_DA output.

Direct current output of the DC/DC converter 317 is converted to an ac voltage by the bridge circuit and applied to the piezoelectric element 220. Control voltages applied to the transistors Q1, Q2, Q3 and Q4 in order to generate the ac voltage is supplied from the pre-driver circuit 319. A P_CLK terminal and a P_EN terminal of the microcomputer 301 are connected to the pre-driver circuit 319, and the bridge circuit generates an ac voltage based on a pulse signal and drive permitted signal supplied from these terminals to drive the piezoelectric element 220.

An amplifier circuit 321 connected to the resistance Ri amplifies a current signal generated by the resistance Ri. Output of the amplifier circuit 321 is connected to a detecting circuit 323, and the detecting circuit 323 converts output of the amplifier circuit 321 to a signal capable of being measured by the A/D converter 303. Since the piezoelectric element 220 is driven by the ac voltage, a current signal flowing in the resistance Ri pulsates. As a method of making this pulsation into a signal that is measurable by the A/D converter 303 it is possible, for example, to smooth the current signal.

Figure 13:
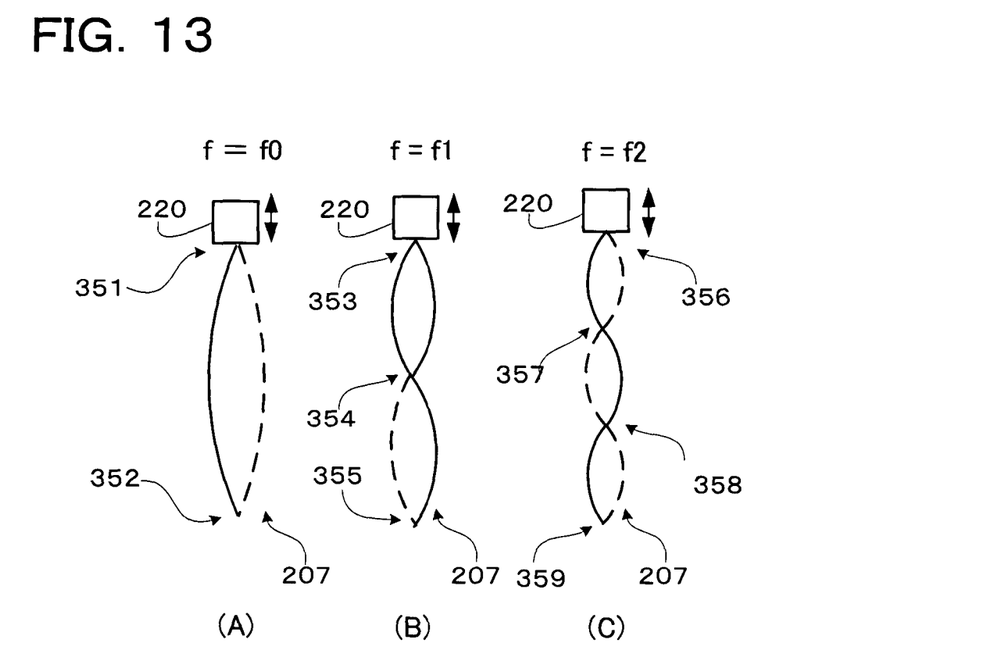
FIG. 13 is a drawing showing standing waves generated in a low pass filter when a drive signal of a resonant frequency is applied to the piezoelectric element, in the first embodiment of the present invention.

In this way, using the piezoelectric element drive circuit 216, an ac voltage is generated at a frequency determined by the P_CLK, and applied to the piezoelectric element 220. Next, how this drive frequency is determined will be described. If the piezoelectric element 220 is vibrationally driven and vibration is applied to the first low pass filter 207, being an optical element, then as shown in FIG. 13 standing waves occur at specified frequencies. FIG. 13 shows a cross section in the case where standing waves occur. FIG. 13(A) shows a standing wave with nodes at the two ends 351 and 352 of the first low pass filter 207, FIG. 13(B) shows a standing wave with nodes at both ends 353 and 355, and also at the center 354, and FIG. 13(C) shows a standing wave with nodes at four places 356-359, namely at the two ends, and at places in between.

Figure 12:
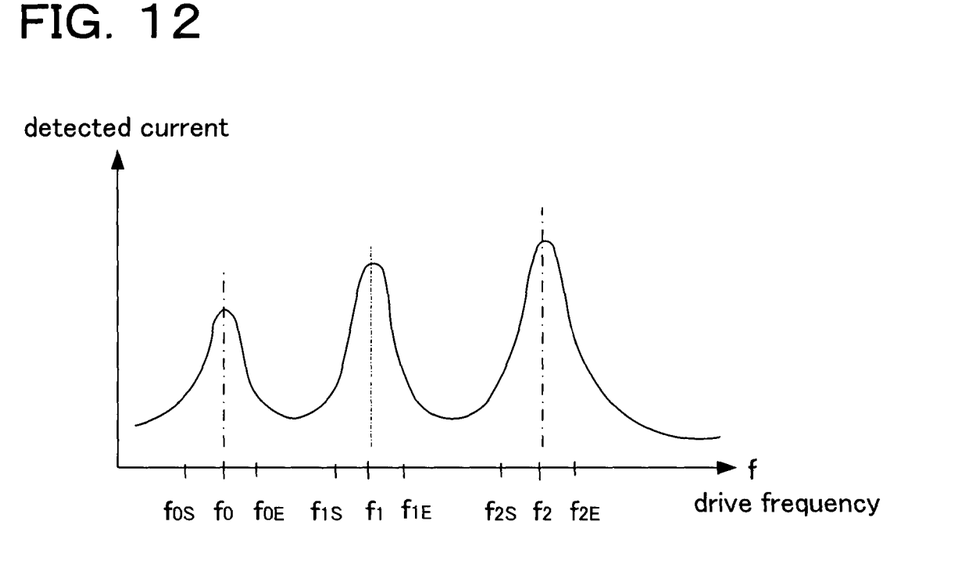
FIG. 12 is a graph showing a relationship between frequency of a drive signal applied to the piezoelectric element and the current at that time, in the first embodiment of the present invention.

At specific frequencies (resonant frequencies) f0, f1, f2 where standing waves occur in this way, drive current flowing in the piezoelectric element is increased, as shown in FIG. 12. At drive frequencies where standing waves occur, the first low pass filter 207 is efficiently vibrated, amplitude of the vibration is large and it is easy to remove dust. The equivalent impedance of the piezoelectric element at this time is small, and if the drive voltage is constant drive current is increased with lowering of the impedance. Accordingly, by detecting a frequency at which the drive current increases most and vibrating the first low pass filter at this frequency, it is possible to efficiently remove dust.

Incidentally, in FIG. 12, three resonant frequencies are shown, but there are also resonant frequencies at even higher frequencies. The resonant frequency also varies according to differences between manufactured optical elements and temperature of the environment etc. The resonant frequency therefore does not have a constant value. However, resonant frequencies exist in particular ranges, and with the example in FIG. 12 there is a possibility of the resonant frequency f0 varying in the range f0S-f0E, the resonant frequency f1 varying in the range f1S-F1E, and the resonant frequency f2 varying in the rage f2S-f2E.

By varying resonant frequency on this way, the microcomputer 301 inside the piezoelectric element drive circuit 216 searches for the resonant frequency and applies that resonant frequency to the piezoelectric element 220. An operation for doing this will be described using the flowchart shown in FIG. 11.

Figure 11:
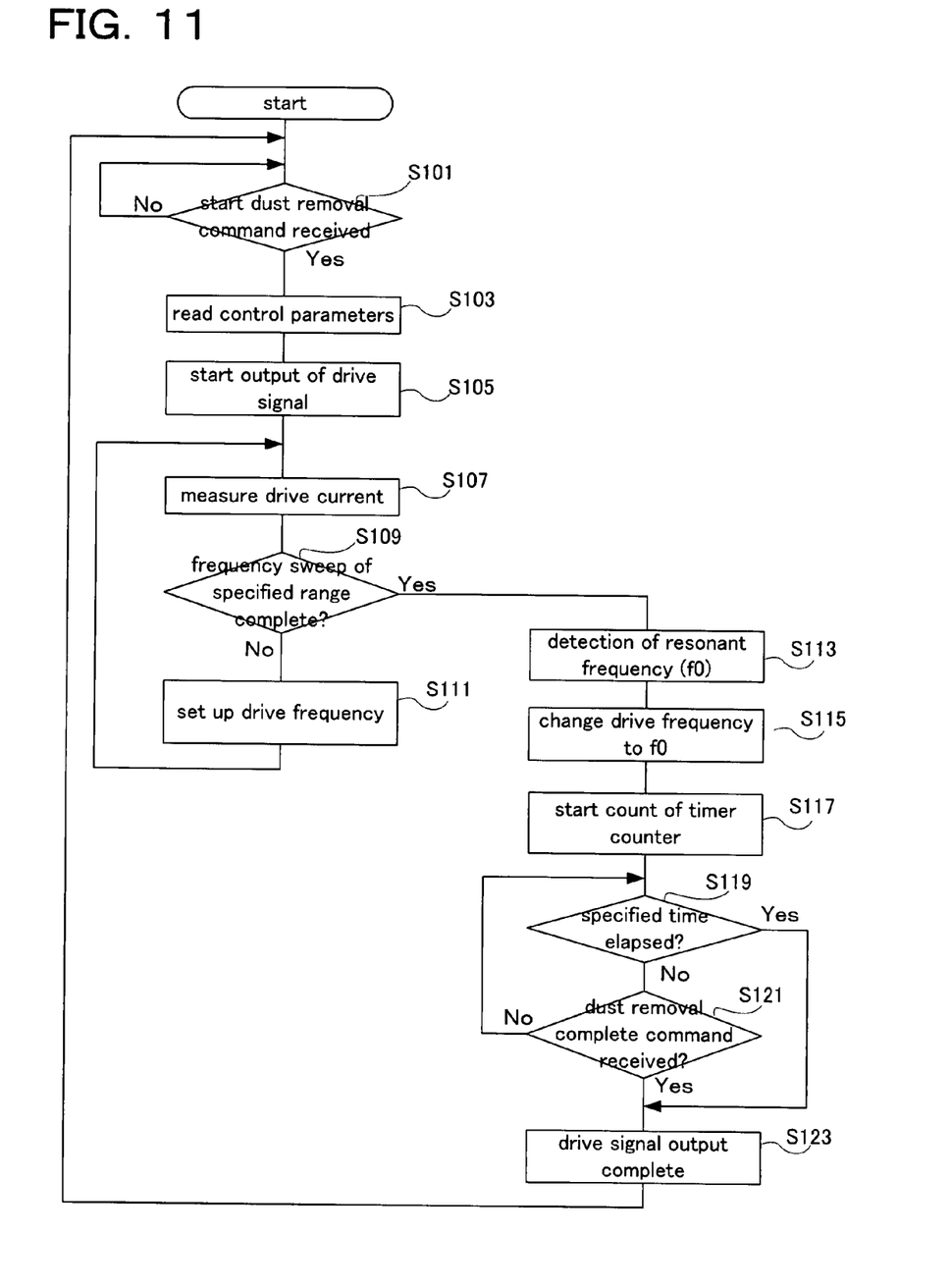
FIG. 11 is a flowchart showing the operation of the piezoelectric element drive circuit of the first embodiment of the present invention.

The microcomputer 301 receives dust removal operation control commands from the input output circuit 239 of the ASIC 262, and executes the operation. The body CPU 229 transmits a "commence dust removal operation command" to the microcomputer 301 at the time of a specified operation of the digital camera, for example, at the time of turning power on, turning power off, starting exposure, completing exposure, changing a lens, etc.

If the microcomputer 301 starts, first of all it is determined whether or not the previously described commence dust removal operation command has been received (S101). Until the commence dust removal operation command is received, a standby state is entered in this step. If the commence dust removal command is received, processing advances to step S103 where control parameters are read from the Flash ROM 311. In this embodiment, the case where one of the nodes occurs on each end, as shown by FIG. 13(A) is assumed. The resonant frequency f0 at this time can not be undeniably determined as the resonant frequency f0 as it varies due to differences between products and environmental temperature, as described above. Therefore, assuming that the fluctuation range for resonant frequency f0 is in a specified range (f0S-f0E), drive frequency is varied within this range, and resonant frequency determined based on drive current detected by the A/D converter 303. This sweep scan range (f0S-f0E) is stored in the Flash ROM 311 as a control parameter.

Once readout of the control parameter is completed, next, output of a drive signal is commenced (S105). Based on the resonant frequency f0S being stored as a control parameter, an initial value is set for the clock divider circuit 307, and operation of the clock generator 309 is permitted. In this step, a pulse signal for frequency f0S from the P_CLK terminal and a drive permitted signal from the P_EN terminal are output to the pre-driver 319. Also, the D/A converter 305 sets a drive voltage. The drive voltage is determined according to characteristics of the piezoelectric element 220, and stored in the Flash ROM 311 as a control parameter.

If output of the drive signal commences, next, the A/D converter 303 measures a drive current (S107). This measured drive current data is associated with drive frequency data, and temporarily stored in RAM, not shown, inside the microcomputer 301.

Next, it is determined if frequencies over the entire range of the specified sweep range (f0S-f0E) have been applied to the piezoelectric element 220. If the determination result is that drive frequency sweep has not been completed over the entire range, processing advances to step S111 where drive frequency is stepped up. Stepping up is changing the set value of the clock divider circuit 307, and supplying drive current to the piezoelectric element 220 at that set drive frequency. After stepping up of the drive frequency has been completed, processing returns to step S107 to measure the drive current at the new drive frequency. If measurement of drive current for drive frequencies in the specified sweep range (f0S-f0E) is completed by repeating steps S107-S109, processing advances from step S109 to step S113. Incidentally, it is possible to carry out the stepping up of the drive frequency at specified frequency intervals. This drive frequency interval is also stored in the Flash ROM 311 as a control parameter.

In step S113, detection of resonant frequency (f0) is carried out. Here, within the drive current data stored in the RAM, the maximum drive frequency is searched for, and this drive frequency is made the resonant frequency f0. In this way, steps from S105 to S113 are steps for detecting frequency (resonant frequency) at which the drive current peaks.

If the resonant frequency f0 is detected, processing next advances to step S115, where in order to change the drive frequency to the resonant frequency the clock dividing circuit 307 is set to the value that will give the detected resonant frequency. The drive frequency for the dust removal operation has thus now been determined, and so the piezoelectric element 220 is then vibrated for a specified length of time. In order to do this, processing advances to step S117, where a timer counter for counting down the specified time period is set, and a count down operation commences. Incidentally, this specified time is one control parameter stored in the Flash ROM 311.

Next, it is determined whether or not a time clocked by the timer has passed the specified time (S119), and if the specified time has not passed processing advances to step S121 where it is determined whether or not a dust removal complete command has been received from the ASIC 262. If the specified time has elapsed, or the dust removal complete command has been received, processing advances to step S123. Even if the specified time has not elapsed after the dust removal operation commences, if an event taking precedence over the dust removal operation occurs, the ASIC 262 transmits a "dust removal complete command" to the piezoelectric element drive circuit 216. When this command is received, even if the specified time has not elapsed, processing advances to step S123 and output of the drive signal is terminated.

In step S123, output of the drive permitted signal from the P_EN terminal is stopped, and the oscillation operation of the clock generator 309 is also stopped. After that, processing returns to step S101, and a standby state waiting for the commence dust removal command is entered.

With this embodiment, as described above, an operation for removing dust is only carried out at the resonant frequency f0. As shown in FIG. 12 and FIG. 13, multiple resonant frequencies exist. It is also possible to detect other resonant frequencies to drive the piezoelectric element 220. It is also possible to apply vibration at multiple resonant frequencies. For example, after driving the piezoelectric element 220 for a specified time at drive frequency f0, it is possible to drive the piezoelectric element 220 for a specified time at drive frequency f1. Incidentally, with the structure of the piezoelectric element 220 constructed as shown in FIG. 7 with two piezoelectric elements 220-1 and 220-2 divided and arranged, it is possible to drive the two piezoelectric elements synchronously. Also, in this embodiment, the piezoelectric element 220 is arranged on the low pass filter 207, and dust is removed, but an optical element where the piezoelectric element 220 is arranged is not limited to the low pass filter, and it is possible, for example, to be any optical element having a possibility of dust becoming attached, such as the infrared cut filter or glass for dust removal.

Next, a second embodiment of the present invention will be described using FIG. 14. With the first embodiment, the resonant frequency f0 was detected and this resonant frequency f0 was supplied to the piezoelectric element 220 as a drive frequency. With the second embodiment, frequency is sequentially varied in a frequency range f0S-f0E without detecting the resonant frequency f0, and a drive voltage is supplied to the piezoelectric element 220 for a specified period of time at each frequency. In the second embodiment, it is possible to do away with the A/D converter 303, amplifier circuit 321, sensing circuit 323 and resistance Ri that were provided in order to detect drive current in the first embodiment.

Figure 14:
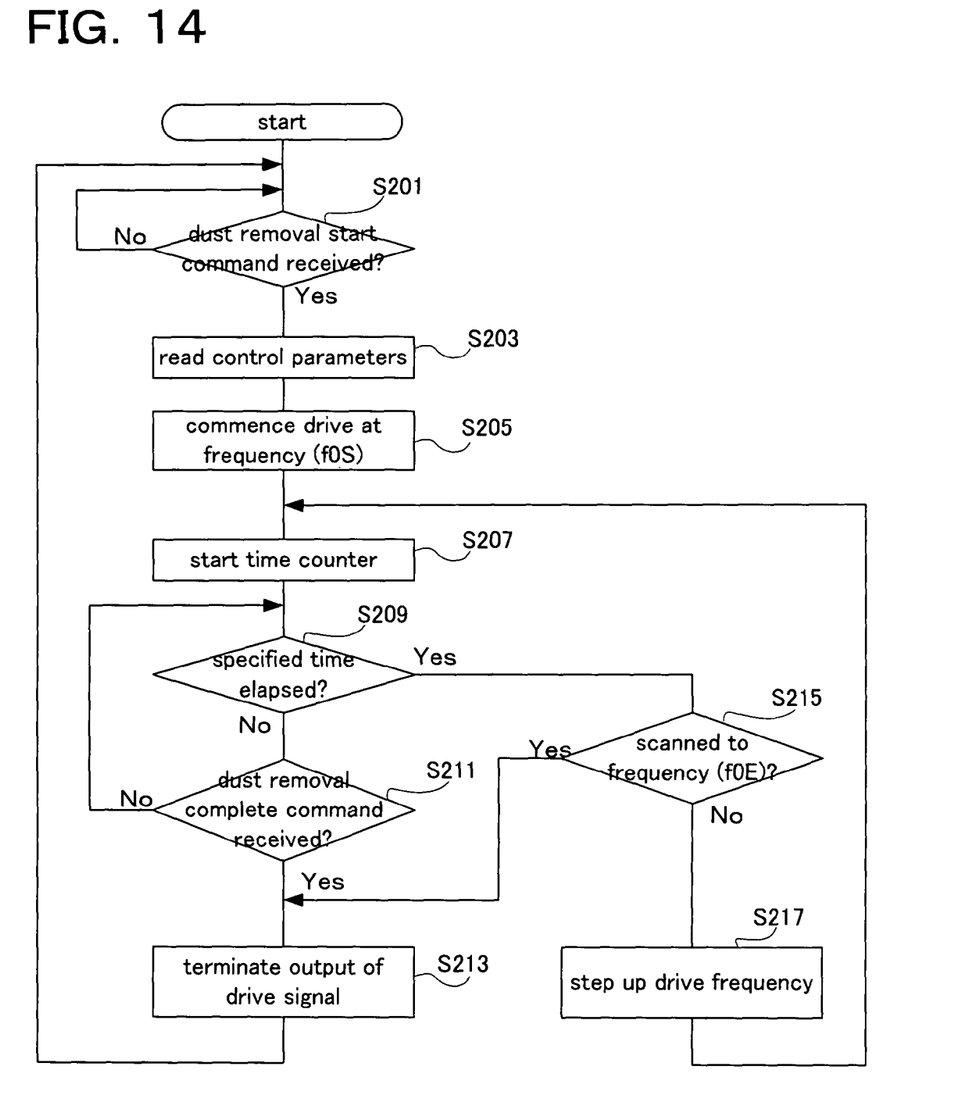
FIG. 14 is a flowchart showing the operation of the piezoelectric element drive circuit of a second embodiment of the present invention.

With the flowchart of FIG. 14, first of all, similarly to step S101, receipt of a "commence dust removal command" is awaited (S201). If this command is received, then similarly to step S103 control parameters are read out of the Flash ROM 311 (S203). In the second embodiment also, nodes occur in two places as shown in FIG. 13(A), and vibration is caused in a resonant state. The resonant frequency f0 at this time is varied according to differences between first low pass filter 207 components and environmental temperature etc. Accordingly, resonant frequency is not definitely f0. Frequency is therefore swept between f0S and f0E, which is the drive frequency range in which the resonant frequency occurs. This sweep (scan) range (f0S-f0E) is stored in the Flash ROM 311 as a control parameter.

Next, drive at frequency f0S is commenced (S205). In order to commence this drive, a value is set in the clock divider circuit 307 based on the initial value f0S in the sweep range acquired as a control parameter, and operation of the clock generator 309 is permitted. In this manner, a pulse signal of frequency f0S is output from the P_CLK terminal. Further, a drive permitted signal is output from the P_EN terminal to the pre-driver circuit 319. Also, a drive voltage is set in the D/A converter 305 according to the characteristics of the piezoelectric element 220. This drive voltage is also stored as a control parameter.

Next, in order to drive the first low pass filter 207 for a specified time at the set frequency, setting of a timer counter is carried out, and a clock operation is started (S207). This set time is also stored as a control parameter. This specified time is a time required to remove dust when the first low pass filter 207 is driven at the resonant frequency.

If the timer is started, processing next advances to step S209 where it is determined whether or not the specified time has elapsed, and in the event that the specified time has not elapsed processing advances to step S211 where it is determined whether or not a dust removal complete command has been received from the ASIC 262. The ASIC 262 transmits a command for dust removal operation completed to the piezoelectric element drive circuit 216 if an event having higher priority than the dust removal operation occurs, even if the dust removal operation is still in progress. If this command is received the dust removal operation should be completed, and processing transfers to step S213.

Returning to step S209, if the specified time has elapsed, processing advances to step S215 where it is determined whether or not the drive frequency has been applied to the piezoelectric element 220 in the specified sweep range (f0S-f0E). Since the sweep starts from frequency f0S, the determination here determines whether or not the current drive frequency is f0E. If the result of determination is that f0E has not been reached, processing advances to step S217 where the set value of the click divider circuit 307 is changed in order to step up the drive frequency. Then, processing transfers to step S207 in order to vibrate the first low pass filter 207 at the set new frequency. This value for stepping up the drive frequency is also stored as a control parameter.

If the dust removal complete command has been received in step S211, and scanning of the drive frequency over the specified sweep range is complete in step S215, processing advances to step S213 where output of the drive signal is stopped. In doing this, first output of the drive permitted signal from the P_EN terminal is stopped, and the clock output of the clock generator 309 is also stopped. After stopping, processing returns to previously described step S201, and a standby state is entered to receive the dust removal commencement command, As has been described above, in the second embodiment the drive frequency is swept in a range in which the resonant frequency f0 exists, and the first low pass filter 207 is vibrationally driven for a specified time at each frequency set during the sweep operation. One of the set frequencies will be equivalent to the resonant frequency, and causes a resonant state as shown in FIG. 12(a).

With this second embodiment, the first low pass filter 207 is vibrationally driven for a specified period of time at all frequencies that have a possibility of being the resonant frequency, which has the drawback that the dust removal time is prolonged, but on the other hand there is no longer any need for a circuit to detect drive current, which gives the advantage that it is possible to simplify the circuit structure of the piezoelectric element drive circuit 216.

The first and second embodiments described above are examples where the present invention is applied to a digital single lens reflex camera, but are not limited to a single lens reflex camera and it is also possible to apply the invention to an interchangeable lens type digital camera or a normal compact digital camera. The present invention can also obviously be applied to an imaging apparatus inside various units such as a mobile telephone, and also to a dedicated camera fitted to various units such as microscopes, binoculars etc. There is a possibility of dust becoming attached to an optical element, and as long as there is an apparatus having a function to remove dust by vibration using a piezoelectric element, it is possible to apply the present invention.

What is claimed is:

1. A digital camera, comprising:
an image sensor for imaging a subject image formed by a photographing lens;
an optical element provided between the photographing lens and the image sensor, at a distance from the image sensor;
a piezoelectric element arranged on the optical element; and
a vibration circuit for vibrating the piezoelectric element so that vibrational waves occur in the optical element;
wherein a volume of the piezoelectric element is based on a density of the piezoelectric element, a mass of the optical element, and vibrational velocity of the optical element that has been previously calculated as a function of (1) the distance between the optical element and the image sensor, and (2) a diameter of dust to be removed from the optical element.

2. The digital camera of claim 1,
wherein the piezoelectric element is arranged on an end surface of the optical element.

3. The digital camera of claim 1,
wherein the maximum size of the piezoelectric element is determined by the width of the optical element.

4. The digital camera of claim 1,
wherein the piezoelectric element is formed from a plurality of piezoelectric bodies, and the total volume of each of the piezoelectric bodies is the volume of the piezoelectric element determined based on density of the piezoelectric element, mass of the optical element, and vibrational velocity of the optical element.

5. The digital camera of claim 1,
wherein the vibration circuit performs vibration of the piezoelectric element at a resonant frequency after detecting the resonant frequency of the piezoelectric element.

6. The digital camera of claim 5,
wherein the vibration circuit detects the resonant frequency based on drive current of the piezoelectric element.

7. The digital camera of claim 1,
wherein the vibration circuit applies a drive frequency to the piezoelectric element while sequentially varying frequency in the vicinity of the resonant frequency of the piezoelectric element.

8. The digital camera of claim 1,
wherein the optical element is a low pass filter.

9. The digital camera of claim 8,
wherein the piezoelectric element is arranged inside one optical member constituting the low pass filter.

10. The digital camera of claim 1,
wherein the piezoelectric element is arranged at a side surface of the optical element, and is laminated in a direction along the side surface.

11. A dust reduction apparatus, comprising:
an optical element separately placed from an image sensing plane a given distance away;
a piezoelectric element arranged on the optical element; and
a vibration circuit for vibrating the piezoelectric element so that vibrational waves occur in the optical element;
wherein a volume of the piezoelectric element is based on a density of the piezoelectric element, a mass of the optical element, and vibrational velocity of the optical element that has been previously calculated as a function of (1) the distance between the optical element and the image sensing plane and (2) a diameter of dust to be removed from the optical element.

* * * * *